United States Patent
de Graaff

(10) Patent No.: US 7,173,390 B2
(45) Date of Patent: Feb. 6, 2007

(54) METHOD OF DETECTING A MALFUNCTION DURING A DISPLACEMENT OF AN ELEMENT BY MEANS OF A DRIVE SYSTEM, AND DEVICE SUITABLE FOR CARRYING OUT SUCH A METHOD

(75) Inventor: Koen A. J. de Graaff, Eindhoven (NL)

(73) Assignee: Assembléon N.V., Veldhoven (NL)

( * ) Notice: Subject to any disclaimer, the term of this patent is extended or adjusted under 35 U.S.C. 154(b) by 0 days.

(21) Appl. No.: 10/523,530

(22) PCT Filed: Jul. 7, 2003

(86) PCT No.: PCT/IB03/03143

§ 371 (c)(1),
(2), (4) Date: Jun. 24, 2005

(87) PCT Pub. No.: WO2004/014767

PCT Pub. Date: Feb. 19, 2004

(65) Prior Publication Data

US 2005/0240292 A1    Oct. 27, 2005

(30) Foreign Application Priority Data

Aug. 6, 2002    (EP)    .................................. 02078242

(51) Int. Cl.
*G05B 23/02*    (2006.01)
*G05B 19/408*    (2006.01)
*G05B 11/32*    (2006.01)
*G05B 9/02*    (2006.01)
*G05B 19/18*    (2006.01)
*G05B 11/01*    (2006.01)
*G06F 19/00*    (2006.01)

(52) U.S. Cl. .................. 318/565; 318/568.22; 700/13; 700/61; 700/69; 700/79; 700/178; 700/255

(58) Field of Classification Search ................. 700/13, 700/56, 61, 69, 70, 79, 175, 178, 255; 702/94, 702/150; 73/1.79, 314; 318/560, 561, 563, 318/565, 568.1, 568.2, 568.22, 568.24
See application file for complete search history.

(56) References Cited

U.S. PATENT DOCUMENTS 4,272,711 A * 6/1981 Fukuyama et al. ......... 318/565

(Continued)

FOREIGN PATENT DOCUMENTS

EP    0 365 681 A    5/1990

(Continued)

Primary Examiner—Crystal J. Barnes
(74) Attorney, Agent, or Firm—Foley & Lardner LLP

(57) ABSTRACT

A method and a device are provided for detecting the occurrence of a malfunction upon movement of an element by a driving system. While the element is being moved, a difference between a predetermined value and an actual value is determined at regular intervals by means of a processor. A derivative of the difference is determined by the processor at regular intervals. The difference and the derivative both fluctuate around an equilibrium value. Subsequently, only the values on one side of the equilibrium value of both the difference and the derivative are sampled. The sampled values are multiplied and the result is compared with a reference value by means of the processor. The occurrence of a malfunction is established if the result of the multiplication is higher than the reference value.

11 Claims, 2 Drawing Sheets

U.S. PATENT DOCUMENTS

| | | | |
|---|---|---|---|
| 4,580,085 A * | 4/1986 | Eto et al. | 318/565 |
| 5,204,598 A * | 4/1993 | Torii et al. | 318/568.1 |
| 5,214,362 A | 5/1993 | Naito et al. | |
| 5,254,921 A * | 10/1993 | Matsubara | 318/561 |
| 5,493,192 A * | 2/1996 | Nihei et al. | 318/568.2 |
| 5,570,770 A * | 11/1996 | Baaten et al. | 192/147 |
| 5,719,479 A * | 2/1998 | Kato et al. | 318/563 |
| 6,185,480 B1 * | 2/2001 | Takahashi et al. | 700/255 |
| 6,429,617 B1 * | 8/2002 | Sano et al. | 318/560 |
| 7,029,175 B2 * | 4/2006 | Karaus et al. | 378/197 |
| 2001/0051841 A1 * | 12/2001 | Kawai | 700/175 |
| 2005/0104549 A1 * | 5/2005 | Nishimura et al. | 318/568.24 |

FOREIGN PATENT DOCUMENTS

GB    1 428 635 A    3/1976

\* cited by examiner

METHOD OF DETECTING A MALFUNCTION DURING A DISPLACEMENT OF AN ELEMENT BY MEANS OF A DRIVE SYSTEM, AND DEVICE SUITABLE FOR CARRYING OUT SUCH A METHOD

BACKGROUND

The invention relates to a method of detecting a malfunction during a displacement of an element by a drive system. The invention further relates to a device suitable for carrying out such a method.

One known method, which is set forth in EP-B1-0 365 681, detects a collision between machine parts driven by servomotors and an object. A processor calculates the derivative of the speed of the servomotor during a preceding period and subtracts it from the derivative of the speed of the servomotor over the present period. The absolute value of the calculated difference is taken, and this is compared by the processor with a given reference value. If the value is greater than the given reference value, this is interpreted as an indication that there is a collision.

The method of EP-B1-0 365 681 has the disadvantage that the detection of a collision takes a comparatively great amount of time. The great amount of time is caused by the minimum time required for detecting the collision, which is equal to the length of the chosen time period. As a result, a malfunction may already have occurred at the beginning of a period currently being measured.

SUMMARY

An object of the present invention is to provide a method wherein the time required for detecting a malfunction is shorter than that of the prior art. This object is achieved according to a method embodiment of the present invention. As compared to the prior art, the processor of this method further determines a derivative of the difference at regular intervals; the difference and its derivative both fluctuate around an equilibrium value. Subsequently, only the values at one side of the equilibrium value of the both the difference and the derivative are sampled. The sampled values of the difference are multiplied by the sampled values of the derivative. The outcome of the multiplication is compared with a reference value by the processor. A malfunction in the displacement of the element is detected if the outcome of the multiplication is higher than the reference value.

The multiplication of the value of the derivative of the difference by the value of the difference at a single side of the equilibrium value generates a curve in time that, at a time of a malfunction, has a slope that is steeper (also denoted comparatively great directional coefficient) than the curve of the value of the derivative and/or the curve of the difference value at that time. As a result, the multiplication curve will rise comparatively quickly in the case of a malfunction and, therefore, the reference value will be reached more quickly, thereby more readily detecting that a malfunction has occurred.

According to an embodiment of the method according to the present invention, the chosen side of the equilibrium value may be dependent on the direction in which the element is displaced. If the element has a certain speed in a certain direction, the speed in said direction will drop below the desired value the moment a collision occurs. This information is relevant for detecting a collision. The information that the speed of the element is higher than the desired value may be of no importance in such a case and may, therefore, accordingly be set to zero.

According to another embodiment of the method according to the present invention, the signals of the derivative may be filtered. An advantage of such filtering is that exclusively those signals that are relevant for making a malfunction detection remain.

According to another embodiment of the method according to the present invention, the predetermined desired value may represent the desired position of the displaceable element, while the actual value may represent the actual position of the element. An advantage of such a method is that the element can be accurately displaced into a desired position, while a malfunction during the displacement, such as a collision, is detected comparatively quickly.

Another object of the present invention is to provide a device by means of which a malfunction in a drive system for the displacement of an element can be detected comparatively quickly. This object may be achieved by an embodiment of a device according to the invention. The device is provided with an element that is displaceable by means of a drive system and with a processor provided with means for comparing a desired value with an actual value, means for determining a derivative, means for determining values lying at one side of an equilibrium value, multiplication means, and means for comparing the outcome of a multiplication with a reference value. A malfunction, such as a collision, can be detected comparatively quickly by means of a device that perform one or more of the method embodiments previously discussed.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
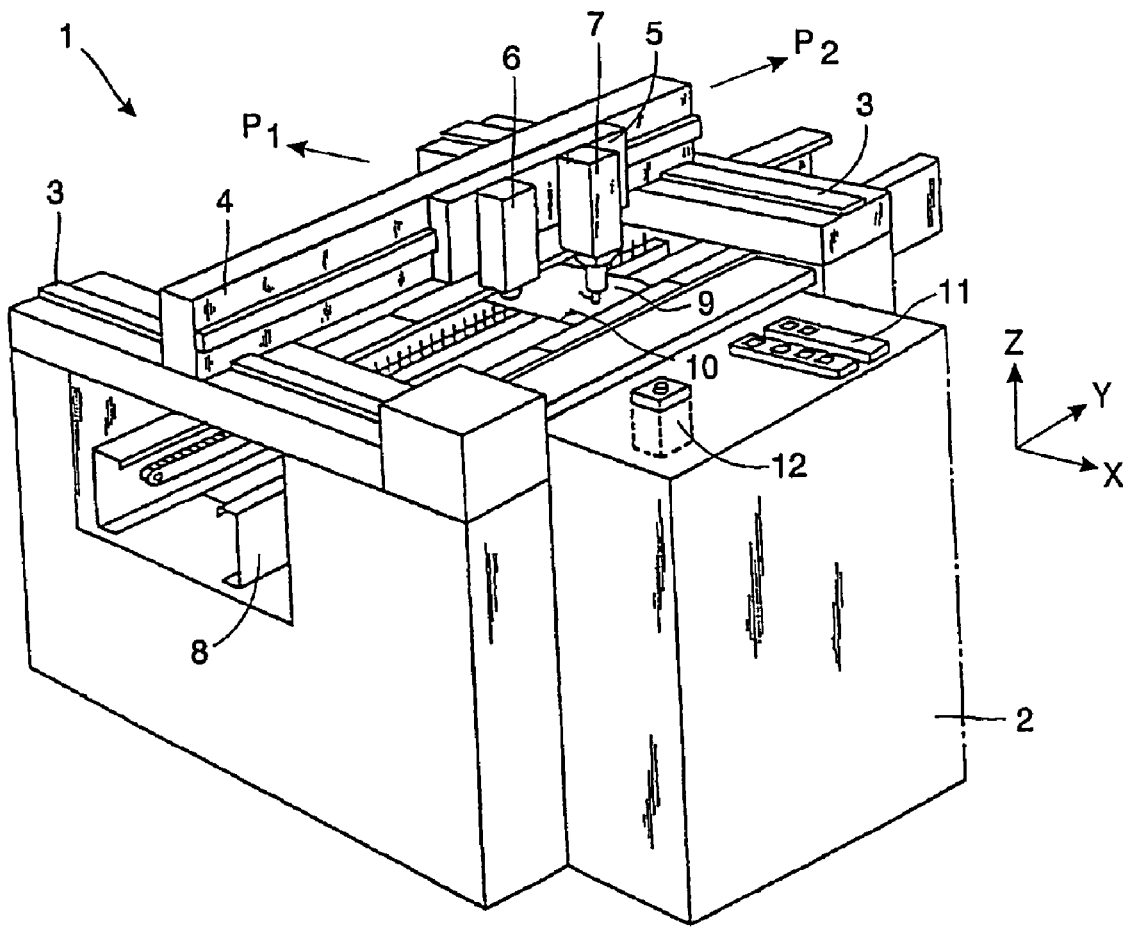
FIG. 1 shows a component placement device according to an embodiment of the present invention.

Corresponding components have been given the same reference numerals in the Figures.

FIG. 1 shows a component placement device 1 that is provided with a frame 2. Rails 3 are situated on the frame 2 at both sides. A guide 4 extends transversely to the rails 3 and is displaceable over the rails 3 by means of a drive system (not shown) in and opposite to the direction indicated by arrow P1. An arm 5 is provided on the guide 4, which arm is displaceable by means of a drive system over the guide 4 in and opposite to the direction indicated by arrow P2. The direction of arrow P2 is perpendicular to the direction of arrow P1. An imaging device 6 and a placement device 7 are fastened to the arm 5.

A transport device 8, by means of which substrates 9 are displaceable in the direction indicated by arrow P2, is present below the arm 5. Each substrate 9 is provided with at least one reference element 10. The component placement machine 1 is further provided with a component feeder device 11 from which components can be taken by the placement device 7. A further imaging device 12 is located on the frame 2.

Figure 2:
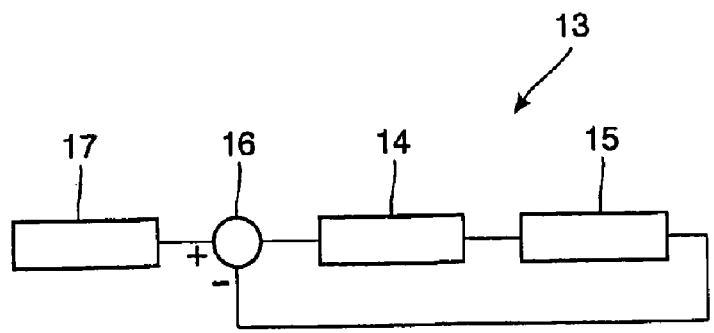
FIG. 2 shows a control circuit of the device shown in FIG. 1, in which a feedback between the processor and the drive system is shown.

FIG. 2 shows a control circuit 13 of a processor of a component placement device 1, diagrammatically showing a controller 14 by means of which a drive system 15 of the arm is controlled. The arm 5 will always be controlled such that the placement device 7 is displaced into a desired position. This desired position is applied to a difference determinator 16 via input element 17. The actual position of the placement device 7 realized by the controller 14 and the drive system 15 will also be applied to this difference determinator 16.

The set-up of the control circuit 13 is conventionally known and, therefore, will accordingly not be described in any more detail.

Figure 3:
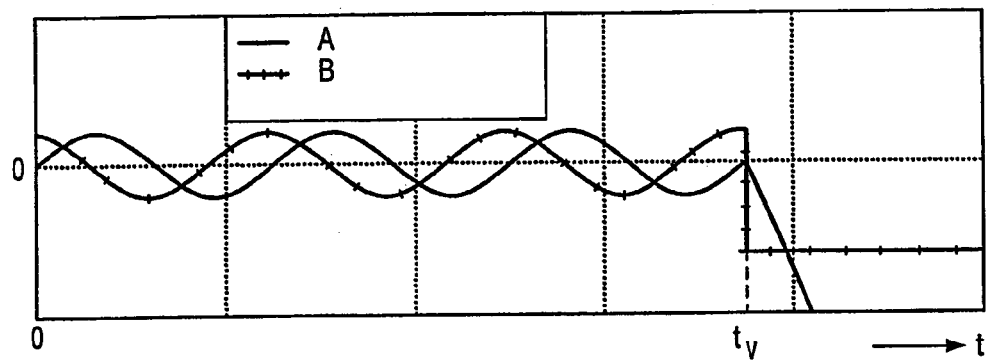
FIG. 3 is a graph representing a difference between a desired value and an actual value in time, and a derivative thereof.

FIG. 3 shows a graph with two curves. Curve A represents the difference between the desired position and the actual position of the placement device 7 versus time (t) while curve B is the derivative of curve A versus time. As is apparent from the graph, curves A and B vary around an equilibrium value 0. It is visible in the graph that a malfunction occurs in curve A at a moment $t_v$, such that the difference between the desired position and the actual position assumes a considerable negative value. Such a situation may arise, for example, if the placement device 7 is displaced in the direction indicated by arrow P1, which direction indicated by arrow P1 corresponds to the negative X-direction. At time $t_v$, curve B, being the derivative of curve A, first shows a steep drop, whereupon it assumes a constant negative value. By way of further example, the malfunction may be caused by the placement device 7, during its displacement, hitting a component already provided on the substrate 9, thereby resulting in a collision.

The actual position of the placement device 7 will never be beyond the desired position in the direction indicated by arrow P1 in the case of a collision during the displacement of the placement device 7 in the direction of arrow P1. This means that the part of the curve for which the difference between the desired position and the actual position is positive may be disregarded. Accordingly, this value is set to zero in the controller 14 in accordance with a method embodiment according to the invention. The resultant curves A' and B' are shown in FIG. 4, which shows the curves A and B of FIG. 3, with the parts of the curves A and B situated above the equilibrium value 0 being reset to 0.

Figure 4:
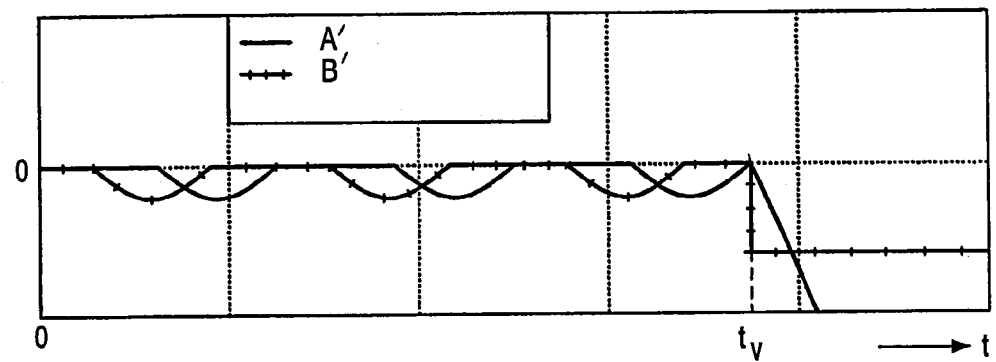
FIG. 4 is a graph of the difference and the derivative of the difference shown in FIG. 3 having the positive parts thereof set to zero.
Figure 5:
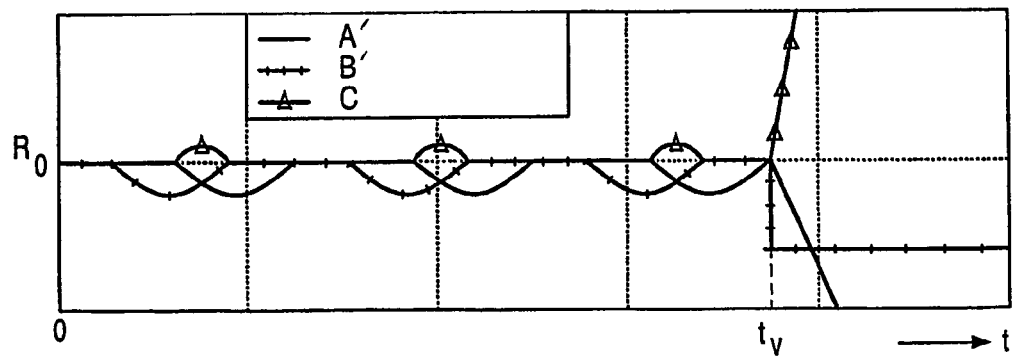
FIG. 5 is a graph of a multiplication of the curves of FIG. 4 in addition to the curves of FIG. 4.

FIG. 5 shows the curves A' and B' of FIG. 4 as well as a curve C, which is the multiplication of the curves A' and B'. Curve C occasionally assumes positive values with a maximum amplitude R that is considerably smaller than the amplitudes of the curves A' and B' over the time period from to $t_0$ to $t_v$. This amplitude over the indicated time period $t_0$–$t_v$ may serve as a reference value R for detecting a normal displacement.

From the moment $t_v$, onwards, i.e., the moment the collision takes place, curve C rises with a very steep gradient. As is visible in FIG. 5, shortly after time $t_v$, the accompanying amplitude of curve C will be considerably higher than the amplitude of curve C in the time period $t_0$–$t_v$.

The moment the reference value R is exceeded, which is the case comparatively soon after moment $t_v$ can be regarded as a signal that a collision has taken place. The arm 5 should now be stopped by means of the processor or be displaced in a direction opposed to that of arrow P1 so as to avoid damage to the placement device 7 and/or the substrate 9.

It is also possible to determine a higher-order derivative instead of the derivative of curve B. A higher-order derivative may be more accurate, but also may increase the required calculation time. Depending on the desired application, a compromise between accuracy and the desired calculation time may be made.

If desired, the controller 14 may carry out a filtering function while determining the derivative, thereby removing noise and other undesirable effects from the measured curve.

It is also possible to supply a desired and actual speed, force, or temperature to the difference determinator 16, instead of the desired and actual positions.

It will be obvious that the desired and actual positions of the placement device 7 processed in the control circuit 13 may relate to the Z as well as the X and Y directions.

It is also possible to apply the method according to the invention to a rotary displacement (i.e., along an arc) rather than the above-described linear displacement.

The graphs of FIGS. 3 to 5 merely show an embodiment of the present invention. In practice, the difference between the actual value and the desired value may fluctuate much more irregularly. In addition, although the transition caused by a disturbance of the derivative may not be a stepped function, it should have a comparatively great directional coefficient.

It is also possible to take a reference value of, for example, 2R instead of the reference value R.

It is also possible to multiply the difference by both the first and the second derivative, so that a malfunction can be detected even more quickly.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The invention claimed is:

1. A method of detecting a malfunction during a displacement of an element by a drive system in a component placement device, said method comprising the steps of:
   determining a difference between a predetermined value and an actual value at a regular intervals during the displacement of the element in the component placement device;
   determining a derivative of the difference at regular intervals, wherein the difference and the derivative both fluctuate around an equilibrium value;
   sampling the values of the difference and the derivative on one side of the equilibrium value;
   multiplying the sampled values of the difference and the derivative;
   comparing the multiplied values to a reference value;
   detecting the malfunction if the multiplied values are greater than the reference value; and
   controlling the drive system with a processor to displace or stop movement of the element when the malfunction is detected.

2. The method according to claim 1, wherein the side of the equilibrium value on which the difference and derivative values are sampled is dependent on the direction in which the element is displaced.

3. The method according to claim 1, further comprising the step of:
filtering the derivative.

4. The method according to claim 1, wherein the predetermined value represents a desired position of the displaceable element, and wherein the actual value represents an actual position of the element.

5. The method according to claim 1, wherein the values of the difference and the derivative are sampled only on one side of the equilibrium value.

6. A component placement device configured to detect a malfunction during a displacement of an element, the component placement device comprising:
a processor configured to:
cause a displacement of the element along a path that defines a series predetermined positions;
determine an actual position of the element corresponding to each of the predetermined positions during the displacement of the element;
determine a difference between each actual position of the element and the corresponding predetermined position of the element;
determine a derivative of the difference, wherein the difference and the derivative both fluctuate around an equilibrium value;
sample the values of the difference and the derivative on one side of the equilibrium value;
multiply the sampled values of the difference and the derivative;
compare the multiplied values to a reference value;
detect the malfunction if the multiplied values are greater than the reference value; and
displace or stop movement of the element when the malfunction is detected.

7. The component placement device according to claim 6, wherein the processor comprises a control circuit, and wherein the control circuit comprises:
a drive system configured to displace the element along the path that defines the series predetermined positions.

8. The component placement device according to claim 7, wherein the control circuit further comprises:
a controller configured to control the drive system.

9. The component placement device according to claim 8, wherein the control circuit further comprises:
an input configured to determine the actual position of the element corresponding to each of the predetermined positions during the displacement of the element.

10. The component placement device according to claim 9, wherein the control circuit further comprises:
a difference determinator configured to determine the difference between each actual position of the element and the corresponding predetermined position of the element.

11. The component placement device according to claim 6, wherein the processor samples the values of the difference and the derivative only on one side of the equilibrium value.

* * * * *